United States Patent [19]
Smith et al.

[11] Patent Number: 5,584,252
[45] Date of Patent: Dec. 17, 1996

[54] RAILWAY FREIGHT CAR

[75] Inventors: Stephen W. Smith, Dallas, Tex.; Joseph C. Lightner, Jr., Greenville, Pa.

[73] Assignee: Trinity Industries, Inc., Dallas, Tex.

[21] Appl. No.: 344,104

[22] Filed: Nov. 23, 1994

[51] Int. Cl.$^6$ ................................................ B61D 25/00
[52] U.S. Cl. .................. 105/409; 296/181; 296/183; 296/191; 105/411
[58] Field of Search ........................ 105/409, 411, 105/401; 296/181, 183, 191, 29

[56] References Cited

U.S. PATENT DOCUMENTS

| | | | |
|---|---|---|---|
| 2,901,283 | 8/1959 | Curell | 105/409 X |
| 3,593,675 | 7/1971 | Dominguez . | |
| 3,664,270 | 5/1972 | Stark et al. . | |
| 3,677,196 | 7/1972 | Schuller . | |
| 3,786,764 | 1/1974 | Beers, Jr. et al. . | |
| 3,789,773 | 2/1974 | McNally et al. . | |
| 3,842,755 | 10/1974 | Carr | 105/409 X |
| 3,844,229 | 10/1974 | Martin . | |
| 3,914,847 | 10/1975 | Martin . | |
| 4,275,662 | 6/1981 | Adler et al. . | |
| 4,286,524 | 9/1981 | Jantzen . | |
| 4,348,962 | 9/1982 | Smith . | |
| 4,362,111 | 12/1982 | Stark et al. . | |
| 4,377,058 | 3/1983 | Hallam et al. . | |
| 4,444,123 | 4/1984 | Smith et al. . | |
| 4,484,527 | 11/1984 | O'Hara . | |
| 4,484,528 | 11/1984 | Anderson et al. . | |
| 4,569,289 | 2/1986 | Gielow et al. | 105/2 R |
| 4,598,646 | 7/1986 | Dugge et al. . | |
| 4,617,868 | 10/1986 | Wahlstrom et al. . | |
| 4,620,487 | 11/1986 | Gielow et al. | 105/2 R |
| 4,633,787 | 1/1987 | Przybylinski et al. | 105/406.1 |
| 4,677,917 | 7/1987 | Dugge et al. . | |
| 4,690,072 | 9/1987 | Wille et al. | 105/406.1 |
| 4,771,705 | 9/1988 | Przybylinski et al. | 105/414 |
| 4,909,154 | 3/1990 | Walker et al. . | |
| 5,119,738 | 6/1992 | Snead . | |
| 5,209,166 | 5/1993 | Tylisz et al. . | |
| 5,335,603 | 8/1994 | Wirick et al. . | |

*Primary Examiner*—Robert J. Oberleitner
*Assistant Examiner*—Kevin D. Rutherford
*Attorney, Agent, or Firm*—Baker & Botts, L.L.P.

[57] ABSTRACT

A railway car (10) is provided. Railway car (10) comprises hopper assemblies (18) having floor panels (22, 24, 26, and 28) that are angled at approximately 40° or less. Floor panels (22, 24, 26, and 28) are fabricated from an aluminum material such that cargo may slide down floor panels (22, 24, 26, and 28) and exit hopper assembly (18) through an outlet (20) with relative ease while maximizing volume. Aerodynamic side posts (54) and improved side plates (58 and 60) which prevent water from entering hoppers (18) are also provided. An improved hatch (56), having first and second coaming portions (88 and 86) that are formed by a single extrusion process, is also presented.

11 Claims, 4 Drawing Sheets

RAILWAY FREIGHT CAR

BACKGROUND OF THE INVENTION

Railway freight cars may be used to transport bulk materials. In transporting such goods, it is desirable to provide railway cars that are efficient with respect to their cost, ease of manufacture, and energy required to move the cars throughout the railway system. Prior art cars have made advances with respect to making cars stronger, lighter in weight, easier to manufacture, and more aerodynamic, but the search continues for improved railway cars that are more efficient in these regards while also increasing the volume.

Hopper cars may be used to transport perishable goods and materials such as grain, corn, and other dry granular commodities. Frequently, a covered hopper car may be used for this purpose. Such hopper cars typically include a roof having an access hatch that is used to load the hopper car. In such railway cars, the roof may be connected to the side by means of a side plate or top chord. With respect to prior art covered hopper cars, a concern was raised that rain water and other liquids may migrate to the interior of the hopper car and potentially destroy or damage portions of the cargo.

In designing hopper cars and other railway cars, it is desirable to maximize the volume of the car. While maximizing the volume is a goal that may be achieved by minimizing the thickness of the sidewalls, the sidewalls must remain strong and durable. The side posts, or side stakes, must carry a load from the roof but also stiffen the side sheets to help carry lateral loads and beam loads. Frequently, cars, such as covered hopper cars, will have numerous side posts spaced along the side of the car to provide support. Conventional hopper cars have required as many as 34 or more side posts per car. Numerous side posts increase the material cost and complexity of the design of the railway car. Additionally, when the side posts are placed on the outside of the side sheet, the side posts, which are frequently rectangular shaped, increase the aerodynamic drag on the car, and thereby, reduce the car's efficiency.

As previously noted, it is desirable to maximize the volumetric capacity of a hopper car. In addition to maximizing the volume of the car, however, the car must be designed to allow for easy and efficient unloading of the cargo or loading through the hopper doors. To facilitate unloading, many conventional hopper cars have angled hopper chutes with a steep incline. In these conventional cars, the incline of the hopper chutes has frequently been 45° or more. This steep of an angle reduces the volume but allows for easy discharge of the cargo.

SUMMARY OF THE INVENTION

In accordance with the present invention, a railway car is provided that substantially eliminates or reduces disadvantages and problems associated with previously developed railway cars.

According to an aspect of the present invention, a roof is connected to the side sheets by means of a side plate having a flange and running along each side sheet. The flange member extends away from the interior of the railway car at the top of the side plate. Additionally, the side plate comprises a coupling member extending down from the bottom portion of the side plate. The roof is coupled to the side plate at the flange member and the side sheet is coupled to the side plate at the coupling member.

According to another aspect of the present invention, a railway car having hopper assemblies disposed on an underframe with truck and wheel assemblies is provided. Each hopper assembly has at least two floor portions that are inclined at an angle of approximately 35°–40° with respect to a top surface of the underframe. The hopper assemblies may be made of aluminum.

According to another aspect of the present invention, the railway car includes side sheets on opposite sides of the car that may be supported by thirteen or fewer side posts spaced longitudinally along the side sheets. The side posts are provided as load bearing members and to give increased support to the side sheets of a railway car. Each side post includes a support body having a top, a bottom, and first and second sides. The support body has a substantially flat portion disposed between the first and second sides of the support body. The post may have enhanced strength, and therefore, a car designed with this aspect of the invention may require fewer side posts which may make the car easier to manufacture and reduce manufacturing expenses.

According to another aspect of the invention, aerodynamic side posts may be included on the railway car. The support body of the side post may have two curved or angled end portions extending from the flat portion to reduce drag. A stiffener disposed on the interior surface of the support body may be included for strength. Finally, the side post may include two fin bodies that are substantially parallel to the flat portion of the support body and are coupled to the two end portions. The fin bodies may extend on both sides of the support body and may increase the strength and bearing surface of the side posts. The aerodynamic posts may reduce the energy required to move a railway freight car incorporating the posts along a railway track.

According to another aspect of the present invention, the side sheets may include die impressions. The die impressions may increase the strength and rigidity of the side sheeting and increase the volume of the car.

According to yet another aspect of the present invention, a hatch is provided that requires only a few components to form a unitary hatch. The unitary hatch may make manufacture of the hopper car easier and less expensive.

A technical advantage of the present invention includes that, in one embodiment, it provides a hopper car wherein the floor of each hopper is oriented at an angle less than conventional hopper cars which may increase the hauling capacity of the hopper relative to conventional hopper cars. The hoppers may be angled at less than 40°, but still be sufficiently angled to discharge the lading without substantial sticking to the hopper.

Another technical advantage of the present invention includes the use of a side plate having a flange member which inhibits moisture or containments from leaking into the hopper car and damaging the cargo. According to this aspect of the invention, the roof is coupled to the side plate at an external flange member so as to substantially eliminate any leakage into the car from between the side plate and the roof into the hopper car.

Another technical advantage of the present invention includes that, according to one aspect of the invention, the number of side posts required to support each side sheet is substantially reduced which may thereby reduce the cost of manufacturing the car and simplify its construction. To reduce the number of side posts, the side posts provided according to the present invention may have increased strength relative to conventional side posts.

Another technical advantage of the present invention includes that, according to one aspect of the invention, thin-but-stiff side posts are provided that allow for the inside width of the car to be increased and thereby increasing the volume of the car.

Another technical advantage of the present invention includes that, according to one aspect of the invention, aerodynamic posts are provided which may reduce the aerodynamic drag of the car. The aerodynamic posts, thus, may increase fuel efficiency of a train pulling a car having the aerodynamic posts.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 7 is a side elevation view of a portion of the top of the railway car of FIG. 1;

FIG. 8 is an enlarged top view in partial cross section of a side post of the railway car of FIG. 1.

DETAILED DESCRIPTION OF THE INVENTION

The preferred embodiment of the present invention and its advantages are best understood by referring to FIGS. 1–9 of the drawings, like numerals being used for like and corresponding parts of the various drawings.

A number of the claimed features may be used on different types of railway freight cars, but are shown and described in the context of a covered railway hopper car. Although described in the context of a covered railway hopper car, the claimed invention should not be limited to this type of car. Except for the features described and claimed below, hopper car 10 is conventional. Such hopper cars are shown and described in the prior art, e.g., as in U.S. Pat. No. 5,209,166, entitled Aerodynamic Self Cleaning Hopper Car, U.S. Pat. No. 4,348,962, entitled Railway Hopper Car Bolster Assembly, U.S. Pat. No. 3,844,229, entitled Railway Hopper Car End Structure Assembly, and U.S. Pat. No. 3,786,764, entitled Rapid Discharge Hopper Car, which are incorporated herein for all purposes.

Figure 1:
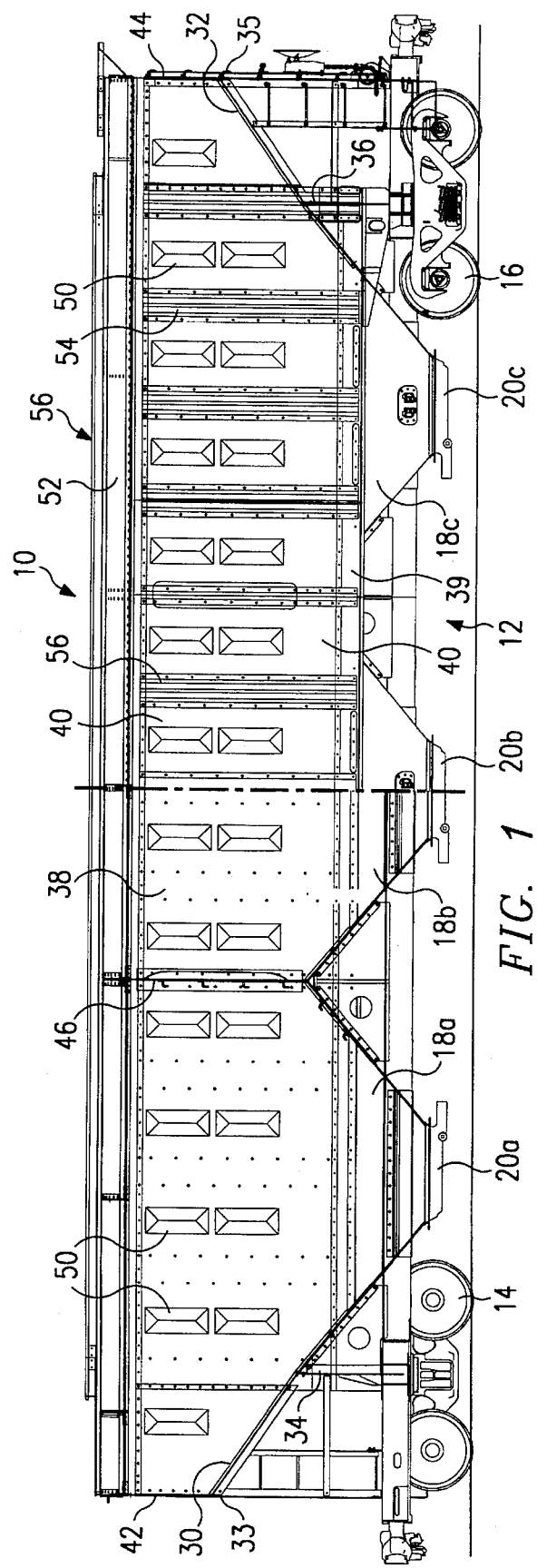
FIG. 1 is a side elevation view of a railway hopper car with portions broken away and incorporating features of the present invention.

FIG. 1 is a side view in elevation with parts broken away of a railway hopper car indicated generally at 10 and constructed according to aspects of the present invention. The left portion of FIG. 1 shows an interior view of hopper car 10, and the righthand portion of FIG. 1 shows an exterior view of hopper car 10. Hatch cover 96 is removed in FIG. 1. Railway car 10 includes steel underframe indicated generally at 12 having a first truck and wheel assembly 14 supported in the usual manner at one end of car 10 and a second conventional truck and wheel assembly 16 supported at the opposite end of car 10.

Railway car 10 includes hoppers 18a, 18b and 18c which are supported at least in part by underframe 12. In this embodiment, there are three hopper assemblies, but there could be more or less; a hopper car may be fabricated according to the teachings of the present invention with any appropriate number of hopper assemblies 18. For sake of clarity and convenience, the designations "a", "b", and "c" are used herein to differentiate between similar parts of different hopper assemblies 18.

Figure 2:
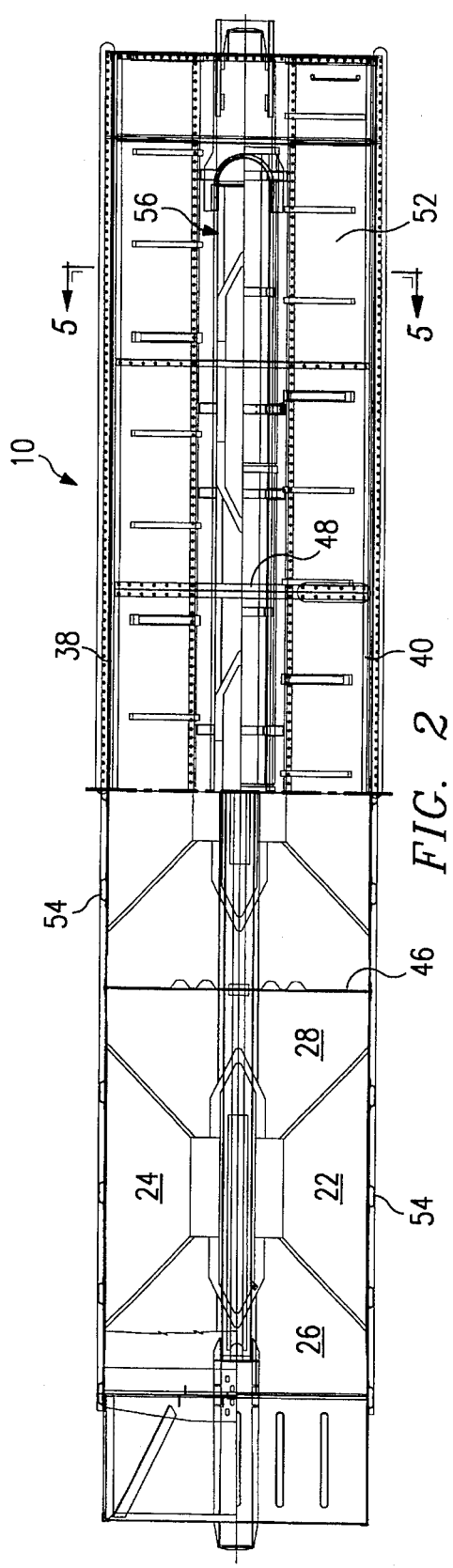
FIG. 2 is a plan view with portions broken away of the railway car of FIG. 1.

Each hopper 18a, 18b, and 18c includes an outlet 20. As shown in FIG. 2, each hopper assembly 18 may comprise four separate hopper floor panels including first and second side hopper floor panels 22 and 24, respectively, and first and second end hopper floor panels 26 and 28, respectively. Hopper floor panels 22, 24, 26, and 28 may be inclined at an angle of approximately 40° with respect to a top plane of underframe 12, such that a lower portion of each floor panel 22, 24, 26, and 28 forms a side of outlet 20. The angle of floor panels 22, 24, 26, and 28 is substantially less than conventional hopper cars. This may provide an increase hauling capacity by as much as 650 cubic feet over conventional hopper cars of similar length.

In the preferred embodiment, hoppers 18 are constructed from aluminum, and for most materials carried by hopper car 10, the coefficient of static friction between the aluminum and the cargo is such that the reduced hopper angle is still sufficient to efficiently unload the material. Aluminum hopper floor panels 22, 24, 26, and 28 allow granular commodities stored in a hopper assembly 18 to slide down panels 22, 24, 26, and 28 and through outlet 20 when the corresponding outlet 20 is opened.

Hopper 18a and hopper 18c are connected with car end floor panels 30 and 32, respectively. Floor panel 30 extends from the end of the car near reference numeral 33 to the opening edge of hopper 18a. End floor panel 32 extends from near reference numeral 35 to the end of hopper 18c. Floor panels 30 and 32 are inclined at an angle of approximately 35° with respect to the top plane of underframe 12.

Railway car 10 further includes opposing first and second side panels or sheets 38 and 40, respectively. Additionally, railway car 10 includes opposing first and second upper end floors or panels 42 and 44, respectively. Hopper 18a may be separated from hopper 18b by partition 46. Hopper 18c may be separated from hopper 18b by partition 48.

Figure 3:
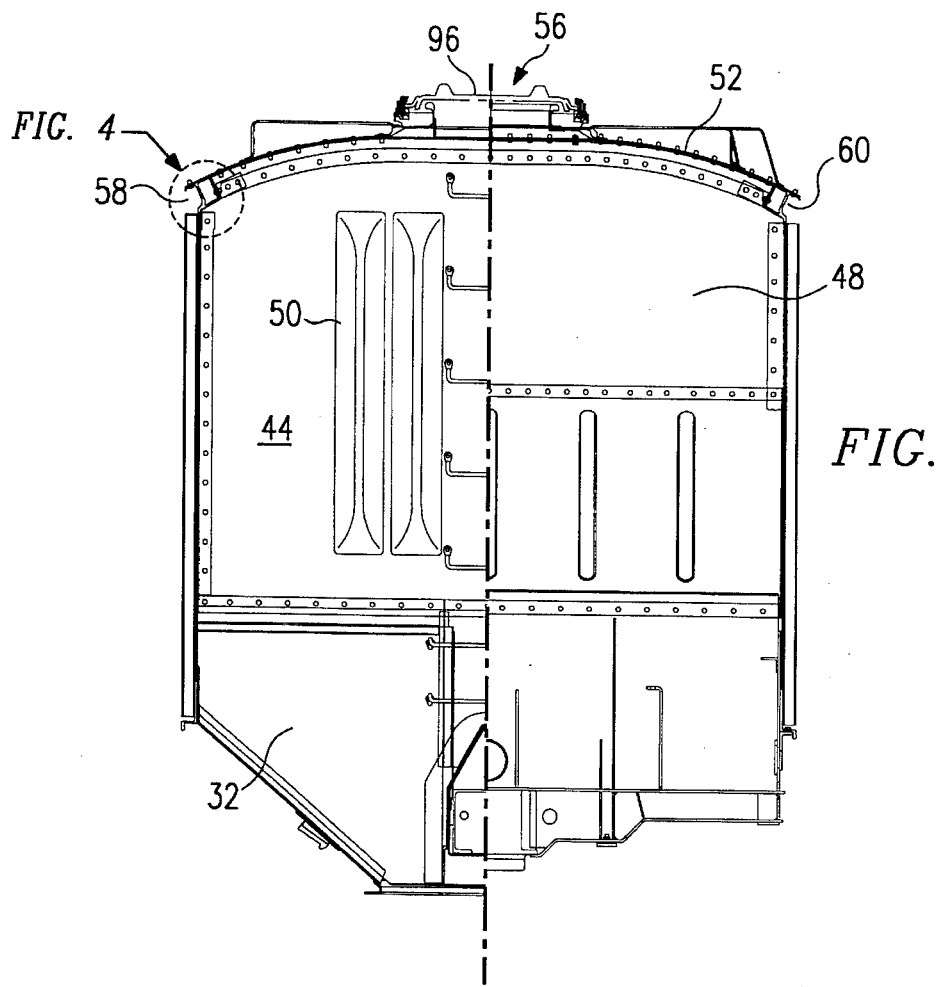
FIG. 3 is an end view in elevation with portions broken away of the railway car of FIG. 1.
Figure 9:
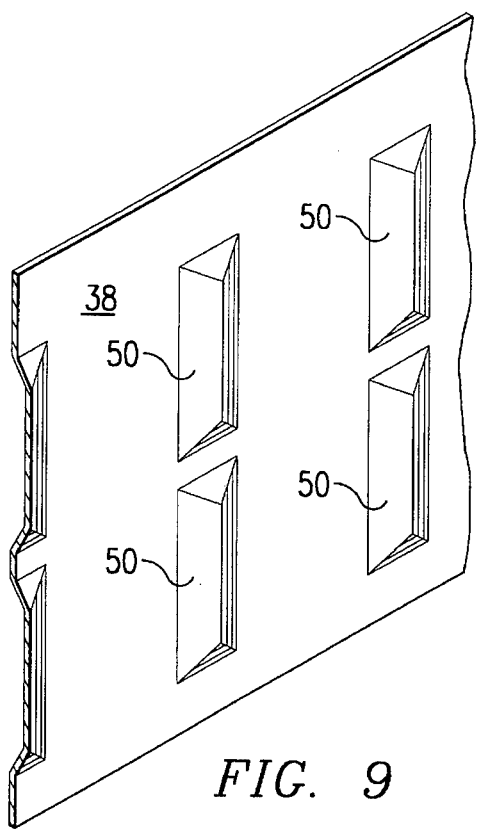
FIG. 9 is a perspective view of a portion of a sidewall of the railway car of FIG. 1.

Each side sheet 38 and 40 may include a plurality of die impressions 50 along its longitudinal length. Die impressions 50 extend outboard of the car so as to form an interior pocket at die impression 50. As shown in FIG. 9, die impressions 50 may provide an increased carrying capacity for railway car 10 and may provide increased strength and rigidity of side sheets 38 and 40. For example, use of die impressions 50 may increase the carrying capacity of railway car 10 by ten or more cubic feet. As shown in FIG. 9, die impressions 50 are shaped substantially like a prism, but other shapes are possible. Die impression 50 may comprise any other appropriate shape for increasing the volume of railway car 10 while strengthening panels or sheets 38 and 48. Die impressions 50 are formed inside sheets 38 and 40 by stamping side sheets 38 and 40 with an appropriate die. As shown in FIG. 3, die impressions 50 may also be included on end panels 42 and 44.

Figure 5:
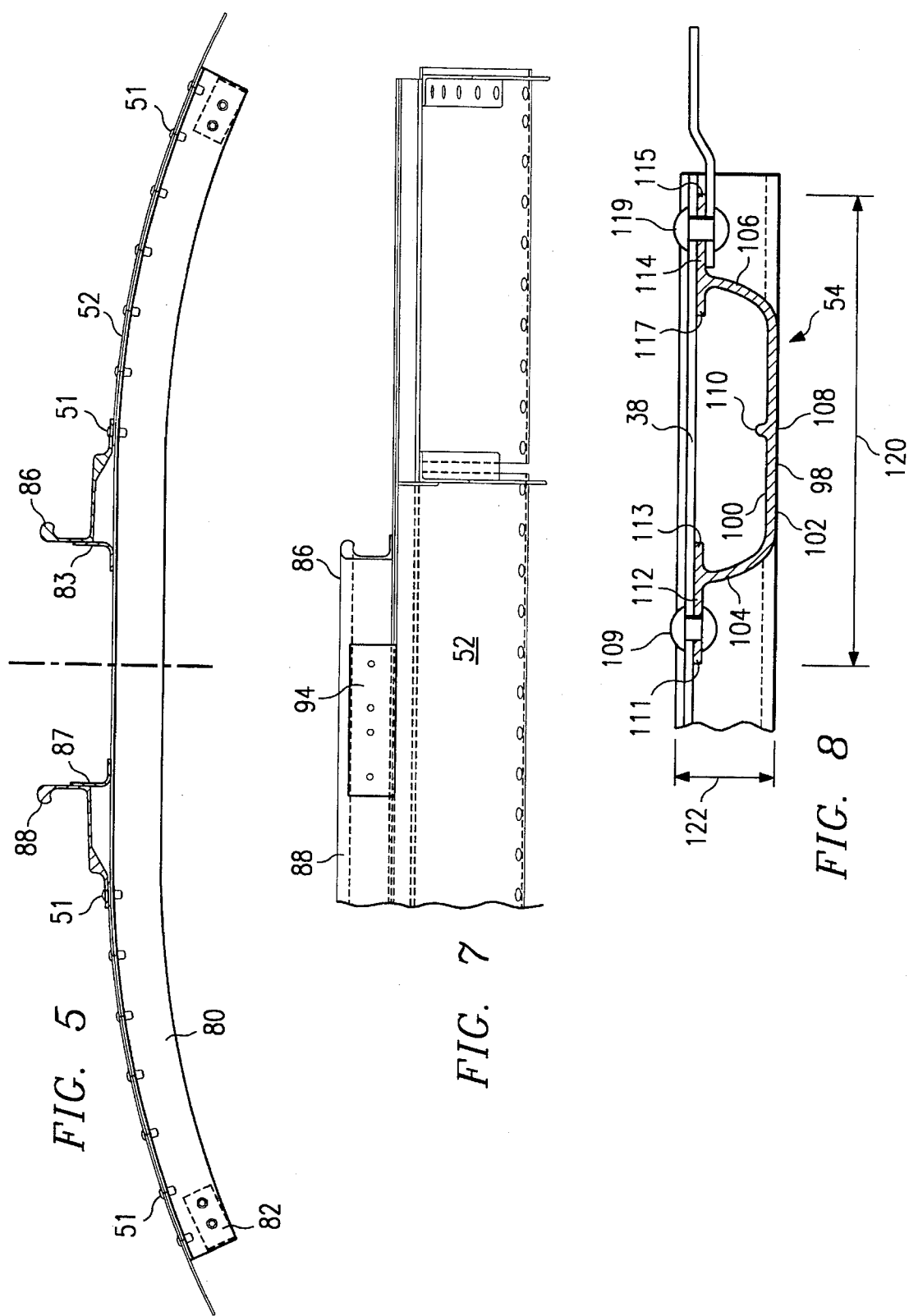
FIG. 5 is a cross sectional view of a roof of the railway car of FIG. 2 taken along lines 5—5.

The embodiment of railway car 10 includes a substantially arcuate roof 52. The arcuate nature of roof 52 is shown in FIGS. 3 and 5. Railway car 10 further includes a hatch 56 formed substantially along the length of roof 52. Railway car 10 includes a plurality of side posts 54, or side stakes, spaced out longitudinally along each of first and second side sheets 38 and 40. Side posts 54 provide support to side sheets 38 and 40 and help support roof 52 and carry lateral loads and beam loads.

FIG. 3 is an end view of railway car 10 in elevation with portions broken away. The right side of FIG. 3 is broken away thereby exposing the partition separating hopper 18c from 18b. As shown in FIG. 3, roof 52 is coupled to side sheets 38 and 40 by side plates (or top chords) 58 and 60, respectively. Side plates 58 and 60 are mirror images of each other and thereby only side plate 58 is described below. The teachings of side plate 58 apply equally to side plate 60.

Figure 4:
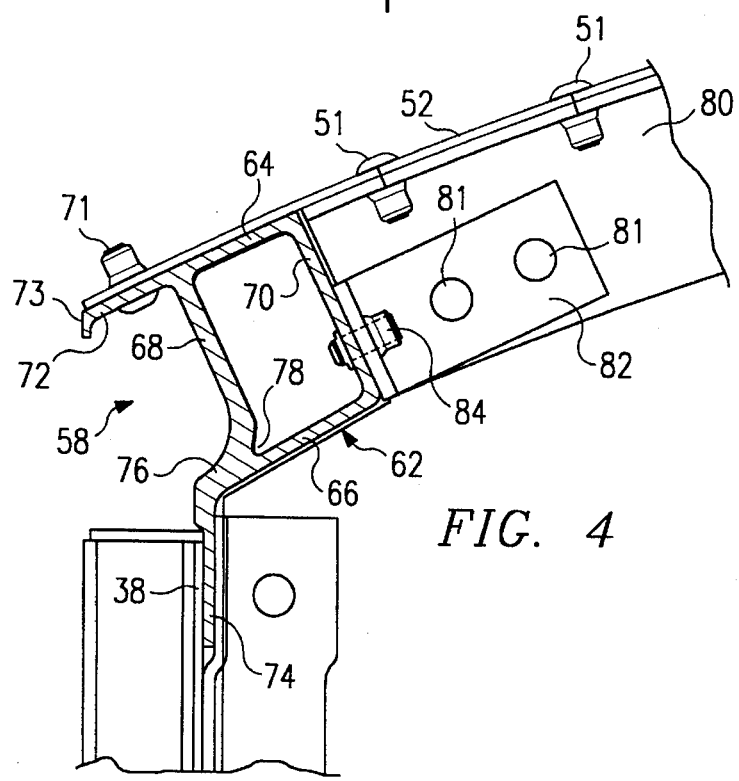
FIG. 4 is an enlarged view in partial cross section of a side plate of the railway car of FIG. 3.

FIG. 4 is an enlarged drawing detail in partial cross section illustrating side plate 58. Side plate 58 includes an elongate member 62 having a substantially rectangular cross section, but other cross sections may be used as well, e.g., a rounded cross section. Elongate member 62 extends along the length of side sheets 38 and 40. Elongate member 62 further includes a top portion 64, a bottom portion 66, and first and second sides 68 and 70. As shown, elongate member 62 has a hollow body.

Side plate 58 has a flange member 72 and a coupling member 74. Flange member 72 extends from elongate member 62 at a junction of top 64 and first side 68 of elongate member 62. Elongate member 62 is coupled to roof 52 at flange member 72. Fasteners 71 may be used to connect roof 52 to flange 72 thereby securing roof 52 to side plate 58. Other attachment techniques such as welding may be used in lieu of fasteners 71 or in combination with fasteners 71. By securing roof 52 outboard of side sheets 38, which is where flange 72 extends, the likelihood of moisture migrating into the interior of car 10 is eliminated or substantially reduced.

Side plate 58 may include a drip ledge 73. Drip ledge 73 may be an extension off of flange 72. Drip ledge 73 helps prevent water from running back under flange 72 and the side sheets 38 or back onto to side plate 58. Drip ledge 73 may be outboard of side sheet 38 and oriented so that water that falls off its lower edge will fall clear of the side sheets 38.

Coupling member 74 extends from elongate member 62 at the junction of bottom 66 and second side 68 of elongate member 62. Coupling member 74 is disposed at an angle with respect to second side 68 of elongate member 62 and bottom portion 66. Coupling member 74 includes a base portion 76 having an increased thickness and may include a notch 78 formed in side plate 58 at the junction of bottom 66 and second side 68. Base 76 and notch 78 provide for increased strength of side plate 58. Coupling member 74 is fastened to side sheet 38. Coupling member 74 may be riveted, welded, bolted or coupled by other means to side sheet 38.

Roof 52 is also coupled to a carline 80 which provides transverse support to roof 52. Roof 52 may be coupled to carline 80 by mechanical fasteners 51, riveting, welding, or other means. Finally, side plate 58 may also be coupled to carline 80 by use of an angle bracket 82 and a blind fastener 84. Angle bracket 82 may be secured to carline 80 by welding, mechanical fasteners, or other means applied in the vicinity of reference numerals 81.

Hatch 56 is a unitary hatch that extends substantially along the length of railway car 10. As shown in FIG. 5, hatch 56 comprises first and second opposite coamings 86 and 88, respectively. Coamings 86 and 88 may be fabricated in a single piece by an extrusion process. Prior to attaching coamings 86 and 88, angled pieces 83 and 87 may be secured to coamings 86 and 88 as shown by welding, mechanical fasteners, or other means. Each coaming 86 and 88, along with attachment pieces 83 and 87, may then be attached to roof 52 with fasteners 51 which also secure a portion of roof 52 or by welding or other means including adhesives. Coamings 86 and 88 are spaced appropriately to receive a hatch covering 96 as shown in FIG. 3.

Figure 6:
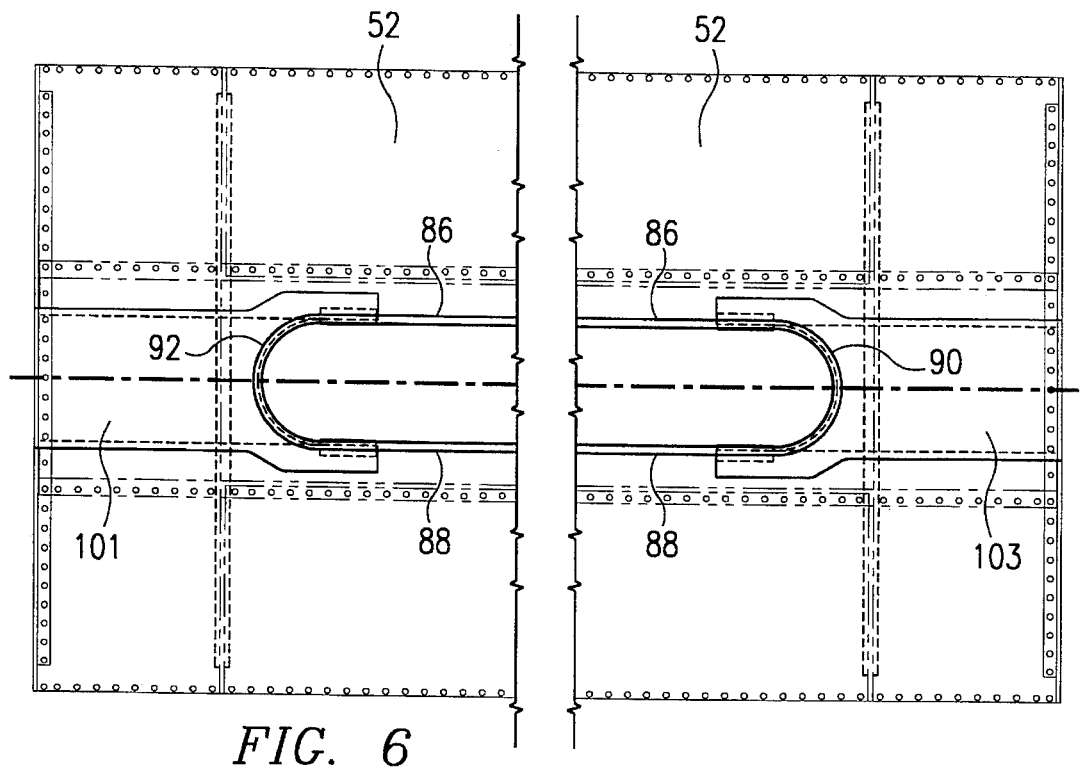
FIG. 6 is a plan view with a portion of the roof removed of the railway car of FIG. 1.

Hatch 56 may further include first and second rounded end or terminal portions 90 and 92, respectively. As shown in FIGS. 6 and 7, terminal portions 90 and 92 are attached to first and second coamings 86 and 88 with a splice plate 94, which may be welded or secured in place by mechanical fasteners. As shown in FIG. 3, hatch cover 96 may be latched in place over hatch 56 to prevent removal or contamination of the cargo of railway car 10. Cover 96 may be connected to either coaming 86 or 88 by any appropriate conventional means such as a latch and hinge mechanism. As shown in FIG. 6, reinforcing plates 101 and 103 may also be included to strengthen the roof from the edges to rounded terminal portions 90 and 92.

FIG. 8 is an enlarged top view in cross section of one of the plurality of side posts 54. Side post 54 comprises a support body 98 having an interior surface 100 and exterior surface 102. Support body 98 further comprises first and second end portions 104 and 106. Support body 98 also comprises a substantially flat middle portion 108 between portions 104 and 106. End portions 104 and 106 may be curved as shown, but also may be angled or perpendicular with respect to the middle portion 108. Thus, support body 98 may have a U-shape or other shape as described above.

Support body 98 may be strengthened by one or more stiffening formations, or stiffeners, 110. Stiffener 110 may extend from top to bottom of side post 54. Stiffener 110 may be centered along flat middle portion 108 of support body 98 or be located at any location on the support body and in any number to increase the strength thereof.

Side post 54 also may include first and second fin members 112 and 114. Fin members 112 and 114 are essentially parallel to flat middle portion 108 of support body 98. Each side post 54 is coupled to either first or second opposite side sheets 38 and 40. By way of example, side post 54 of FIG. 8 is shown coupled to first side sheet 38. Fin members 112 and 114 extend from interior surface 100 and exterior surface 102 of support body 98. Portion 111 of fin 112 extends outwardly from surface 102 and provides a location for the attachment of a mechanical fastener such as rivet 109 which may be used to secure side post 54 to side sheet 38, but other means for attaching may be used, such as welding. Additionally, fin 112 may include an interior portion 113 extending from internal surface 100, which enhances the strength of body 98 and increases the bearing surface between side post 54 and the side walls. Fin 114 may include an analogous external portion 115 and internal portion 117 and fastener 119. Side posts 54 run from side sills 39 to side plate 58. Side posts 54 may be extruded from aluminum or other suitably strong and light weight material.

An important aspect of the present invention is that side posts 54 are formed as thin-but-stiff side posts. The thin-but-stiff design allows for thinner (less depth) posts 54, which in turn, allows for the side-to-side interior dimension of the car to be increased which increases the volume without the car extending beyond the design envelope. The thin-but-stiff posts 54 have a smaller depth and a greater width than on conventional posts. Referring again to FIG. 8, the width of the post 54 is shown by reference line 120 and the depth by reference line 122. In the preferred embodiment, the depth 122 is about 2 11/16 inches and the width 120 is about 15 ½ inches, which is a depth to width ratio of about 0.173. The depth/width ratio envisioned may include other ratios, for example, 0.2 or less.

Side post 54 provides increased aerodynamic characteristics compared with conventional side posts. Curved portions 102 and 104 are designed to provide less wind resistance or drag by having rounded or curved portions 104 and 106. In addition to the aerodynamic advantages of side posts 54, the design allows for a side post having enhanced strength. Because of the enhanced strength, side post 54 may be made with increased width as necessary to accommodate fewer side posts being placed on car 10 as compared to conventional cars. A conventional car may include as many as eighteen or more side posts per side, whereas under the present invention, thirteen or fewer side posts may be used and yet posts 54 still provide adequate strength and stiffness.

Although the present invention has been described in detail, it should be understood that various changes, substitutions and alternations can be made hereto without departing from the spirit and scope of the invention as defined by the appended claims.

What is claimed is:

1. An aerodynamic side post for attachment to a side sheet of a railway car, the side post comprising:
   a support body having first and second curved ends and an elongate flat middle portion;
   a stiffener formed on an interior surface of the support body;
   first and second fin bodies substantially parallel to the flat middle portion and coupled to the first and second ends of the support body, respectively;
   a first interior fin portion connected to the first fin body and the first curved end at their juncture;
   a second interior fin portion connected to the second curved end and second fin body at their juncture.

2. The aerodynamic side post of claim, 1, wherein the stiffener is centered on the flat portion of the support body between the first and second curved ends.

3. The side aerodynamic post of claim 1, wherein the stiffener extends from a top to a bottom of the support body.

4. The side aerodynamic post of claim 1, wherein the support body, the stiffener, and the first and the second fin bodies comprise an integral piece of aluminum.

5. The side aerodynamic post of claim 1, wherein said support body has a width and a depth and wherein a ratio of the depth to the width is less than 0.2.

6. A side post for attachment to a side sheet of a railway car, the side post comprising:
   a first curved end portion;
   a second curved end portion;
   a substantially flat middle portion connecting the first and second end portions;
   a first fin connected to the first curved end portion and extending outward therefrom;
   a second fin connected to the second curved end portion and extending outward therefrom;
   first interior fin portion connected to the first fin and the first curved end portion where the first fin and the first curved end portion are connected;
   a second interior fin portion connected to the second fin and the second curved end portion where the second fin and the second curved end portion are connected; and
   a stiffener disposed on an interior surface of the flat middle portion.

7. The side post of claim 6, wherein the stiffener is centered on the substantially flat middle portion between the first curved end portion and the second curved end portion.

8. The side post of claim 6, wherein the stiffener extends from a top to a bottom of the substantially flat middle portion.

9. A railway car, comprising:
   an underframe;
   first and second truck and wheel assemblies disposed at opposite ends of the underframe;
   a roof; and
   a plurality of side posts disposed between the roof and the underframe, each side post having a width and a depth, each side post comprising:
   a first curved end portion,
   a second curved end portion,
   a substantially flat middle portion connecting the first and second end portions,
   a first fin connected to the first curved end portion and extending outward therefrom,
   a second fin connected to the second curved end portion and extending outward therefrom.
   a first interior fin portion connected to the first fin and the first curved end portion where the first fin and the first curved end portion are connected,
   a stiffener disposed on an interior surface of the flat middle portion, and
   wherein a ratio of the depth to width is less than 0.2.

10. A side post for attachment to a side sheet of a railway car, the side post comprising:
    a first curved end portion having a radius of curvature of approximately three inches;
    a second curved end portion having a radius of curvature of approximately three inches;
    a substantially flat middle portion connecting the first and second end portions;
    a stiffener disposed on an interior surface of the flat middle portion;
    a first interior fin portion connected to the first fin and the first curved end portion where the first fin and the first curved end portion are connected; and
    a second interior fin portion connected to the second fin and the second curved end portion where the second fin and the second curved end portion are connected.

11. The side post of claim 10 wherein a first linear distance measured from an outward most edge of the first fin to the outward most edge of the second fin is approximately 15.5 inches; and
    wherein a second linear distance measured from the substantially flat middle portion to the first fin (in a direction substantially perpendicular to the first linear distance) is approximately two and eleven-sixteenth inches.

* * * * *